United States Patent [19]
Kotzab

[11] Patent Number: 5,772,933
[45] Date of Patent: Jun. 30, 1998

[54] METHOD FOR TEMPERING AN INJECTION MOLD HAVING AT LEAST ONE HEATED NOZZLE OR HOT RUNNER

[76] Inventor: Werner Kotzab, Heinestrasse 7, D-97422 Schweinfurt, Germany

[21] Appl. No.: 542,161

[22] Filed: Oct. 12, 1995

[30] Foreign Application Priority Data

Oct. 12, 1994 [DE] Germany .......................... 44 36 376.1
Dec. 10, 1994 [DE] Germany .......................... 44 44 092.8

[51] Int. Cl.$^6$ .................................................. B29C 45/75
[52] U.S. Cl. .................................. 264/40.6; 264/328.15; 264/328.16; 425/144; 425/548; 425/549; 425/552
[58] Field of Search .............................. 264/40.6, 328.14, 264/328.15, 328.16; 425/143, 144, 548, 549, 552

[56] References Cited

U.S. PATENT DOCUMENTS

| | | |
|---|---|---|
| 4,354,812 | 10/1982 | Wieder et al. . |
| 4,420,446 | 12/1983 | Wieder et al. . |
| 5,062,053 | 10/1991 | Shirai et al. .............................. 425/136 |
| 5,264,163 | 11/1993 | Lemelson ................................ 264/40.6 |
| 5,283,018 | 2/1994 | Inaba et al. ............................. 425/136 |
| 5,320,513 | 6/1994 | Schmidt .................................. 264/40.6 |
| 5,419,858 | 5/1995 | Hata et al. .............................. 264/40.6 |
| 5,423,670 | 6/1995 | Hamel ..................................... 264/40.6 |
| 5,427,720 | 6/1995 | Kotzab .................................... 264/40.6 |
| 5,525,050 | 6/1996 | Takizawa et al. ....................... 264/40.6 |
| 5,589,114 | 12/1996 | Evans ..................................... 264/40.6 |

FOREIGN PATENT DOCUMENTS 40 32 562 A1 4/1992 Germany .
43 07 374 A1 9/1994 Germany .

OTHER PUBLICATIONS

PLASTverarbeiter, No. 5, pp. 74–81, 1984.
Plaste und Kautschuk, pp. 132–134, 1988.

*Primary Examiner*—Jill L. Heitbrink
*Attorney, Agent, or Firm*—Browdy and Neimark

[57] ABSTRACT

A method for tempering an injection mold wherein in a recurrent cycle, the molten material is introduced under pressure into the mold recess of the injection mold, hardened and removed from the mold. Coolant or heating medium is supplied as a function of the deviation of the measured actual temperature from the desired command temperature. A plurality of flow control valves for the coolant or heating medium are preferably controlled via a measuring sensor. The three-dimensional quantitative distribution of coolant as needed is ascertained empirically or by computer with respect to the particular mold and the runners provided in the mold for the coolant or heating medium, and at least one specific time in the cycle period a comparison is made between the command temperature and the actual temperature of the one measuring sensor. The plurality of flow control valves are triggered as a function of the ascertained temperature deviation and as a function of the three-dimensional quantitative distribution profile, is distinguished in that a separate controller, each with a separate processor, is provided for cooling and heating, respectively. The amounts of heat to be supplied to the various regions of the mold in the next injection cycle at any time, resulting from heating and from the thermal quantity of the melt, is transmitted beforehand to the controller of the cooling runners, and the coolant quantities are controlled as a function of these heat amounts, transmitted beforehand, for the next cycle that follows.

7 Claims, 2 Drawing Sheets

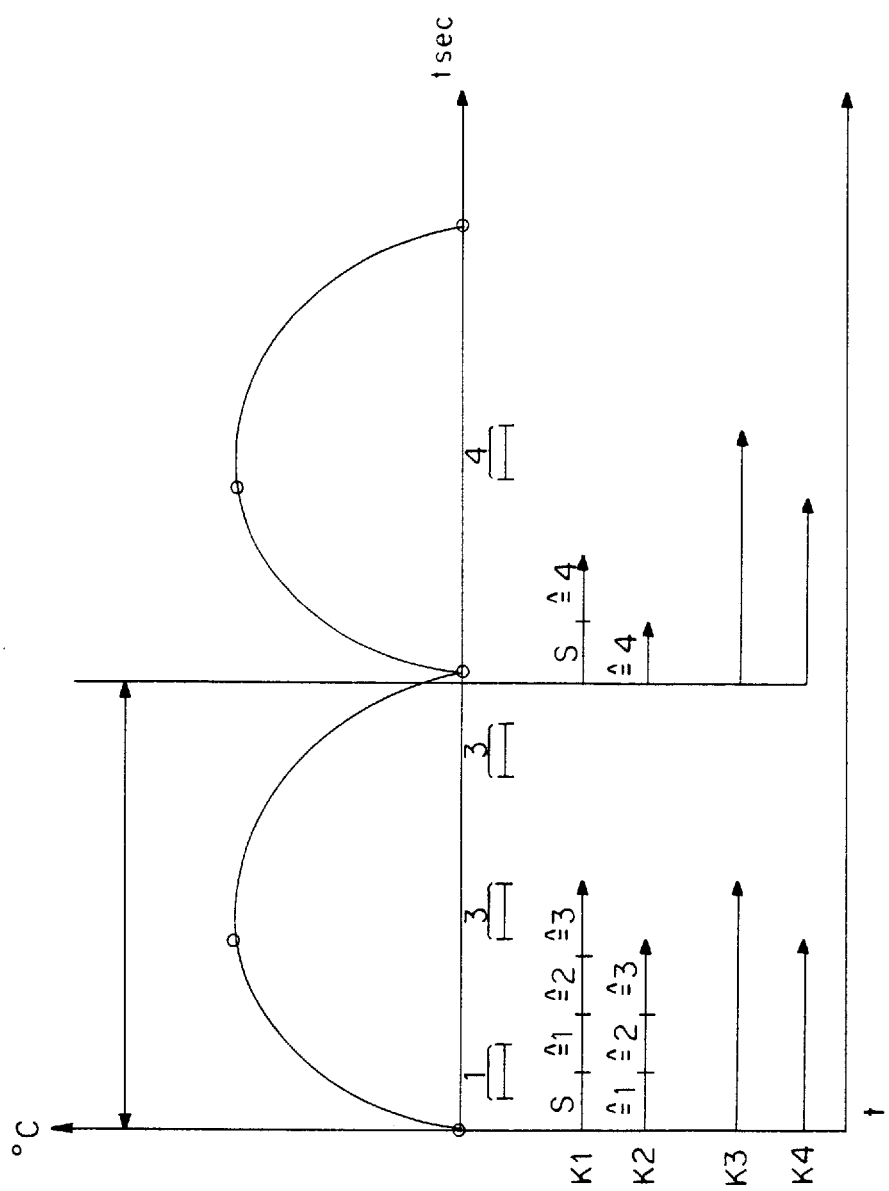

METHOD FOR TEMPERING AN INJECTION MOLD HAVING AT LEAST ONE HEATED NOZZLE OR HOT RUNNER

BACKGROUND OF THE INVENTION

1. Technical Field

The invention is directed to a method for tempering an injection mold, especially for plastic and aluminum diecasting. Molten material is introduced under pressure into the mold recess or recesses of the injection mold by means of an extruder or the like in a recurrent cycle. The molten material is hardened there, removed from the mold, and at the beginning of a new cycle molten material is again supplied under pressure. The temperature during the cycle is measured via at least one temperature measuring sensor and compared with a predetermined command temperature. Thereafter a coolant or heating medium is supplied as a function of the deviation of the measured actual temperature from the desired command temperature.

2. Prior Art

Such methods are known per se, for instance from U.S. Pat. No. 4,420,446 or U.S. Pat. No. 4,354,812. The publications by the present applicant, "Exakte Temperierung bei geringem Kostenaufwand"[Exact Tempering at Low Cost] in the journal "PLASTverarbeiter"[Plastics Processor]1984, No. 5, pp. 74–81, and by Rolf Roßback, "Konstruktive Auslegung der Temperierkanäle in Hochleistungsspritzwerkzeugen"[Constructional Design of the Tempering Runners in High-Powered Injection Tools] in "Plaste und Kautschuk"[Plastics and Rubber], 1988, pp. 132–134, also address this group of problems.

A method which compared with the known prior art has already provided considerable improvement in tempering and has in the meantime been put to use with great success is known from German Patent Application P 40 32 562. It provides a plurality of flow control valves for the coolant or heating medium which are preferably controlled via a heating sensor. A three-dimensional quantitative distribution of coolant as needed is ascertained empirically or by computer with respect to the particular mold used and the runners provided in the mold for the coolant or heating medium. Upon each cycle, at least one specific time in the cycle period, a comparison is made between the command temperature and the actual temperature of the one measuring sensor, and the plurality of flow control valves are triggered as a function of the ascertained temperature deviation and the three-dimensional quantitative distribution profile of coolant or heating medium. As a result, it is possible to minimize the pacing times while maintaining optimal injection molding quality.

Recently, injection tools with a hot runner are being used increasingly in order to make sprue-free injection molded articles. Such hot runners have the advantages of economy of material, given the absence of sprue stalks, with minimal pinpoint gating without ring marking, streamlined performance of the thermoplastic melt at low pressure loss, and problem-free changes of color and material. Such injection molding tools still have problems, however, for very thin-walled parts where the amount of heat in the melt is on the order of magnitude of the amount of heat in the external heater, so that in the final analysis, because of the heat involved in heating the hot runner for plastic, the cycle times become longer again, and so the intrinsic advantages of injection tools with hot-air runners are lost.

Moreover, problems typically arise because separate controllers are provided for heating and cooling, which can cause "rocking" of the regulating circuits back and forth.

OBJECT AND SUMMARY OF THE INVENTION

With this point of departure, the object of the invention is to improve a method and an apparatus, of the kind known from German Patent Application P 43 07 347. This is accomplished by taking into account the heat supply to the hotair runner for the plastic and the resultant propagation of heat in the injection molding tool. This permits improving the tempering performance in such a way that optimally short pacing times can be realized.

This object is attained in that a separate controller, each with a separate processor, is provided for cooling and heating, respectively. These processors are connected to one another via a data bus so that the amounts of heat to be supplied to the various regions of the mold in the next injection cycle which result from heating and from the thermal quantity of the melt, are transmitted beforehand to the controller of the cooling conduits, and the coolant quantities are controlled as a function of these heat amounts, transmitted beforehand, for the next cycle that follows.

According to the invention, a heat quantity balance is achieved and as a function of it a coolant quantity balance for one injection cycle is also achieved. To that end care is taken to avoid drifting of a temperature, especially upward, from the very outset by making available an appropriate quantity of coolant. This also means that quite soon after the injection, the heat energy from the melt and from the hot runner for the plastic is dissipated, and the optimal temperature for ejecting the molded article from the mold and for injecting again can be done so as to permit very short pacing times.

A further feature of the invention allows the temperature measuring sensor disposed in the vicinity of the cavity in the mold to monitor the temperature continuously. The detected temperature is compared with a lower temperature threshold, and as soon as this lower temperature threshold fails to be obtained, the heating output is reduced via controlling the hot runner for the plastic. A drop to below the temperature threshold is considered to be a sign that for whatever reasons, a new injection operation that is expected on the basis of the pacing time has not occurred. Under such conditions, the danger is that the heated injection molding composition will carbonize in the hot runner for the plastic and cause obstructions. This is reliably avoided by reducing the heating output in accordance with the invention.

To control the coolant quantities, an energy balance of the injection cycle is achieved. Proceeding in this way furnishes markedly better results than conventional methods, in which work was done with a heat flow balance.

A differentiated detection of the temperature gradients between the cavity and the outer surfaces is performed as a function of whether it relates to a mold plate, an intermediate plate, or a removed plate of the injection tool. Accordingly, cooling conduits that are not disposed directly on the cavity can be taken into account in the energy balance. Thus, the temperature differences in the medium and the cooling conduits and the affected plate regions are detected. The time for the heat throughput and heat transfer can be determined. Moreover, the optimal spacing among cooling conduits can be calculated, taking into account the heat dissipation from the cavity regions remote from the cooling runner within the cycle time.

Further, when the heat transfer is detected, different heat transfer coefficients for standing and flowing coolant, in particular water, in the cooling conduits are taken into account.

An arrangement for performing the above-described process is distinguished in that the control module for heating and the control module for cooling each have a separate microprocessor, which are connected to one another via a data bus.

It may also favorably be provided within the scope of the invention that one additional temperature measuring sensor each is disposed in the coolant feed and in the coolant return. As a result, from the ascertained rises in temperature in combination with the measurement of quantity, the heat energies and heat transfer coefficients can be ascertained at the tool. Moreover, in the calculation of the pulse lengths, the thus-ascertained heat energies can be taken into account and used together with the precalculated pulse lengths.

It may also be provided within the scope of the invention that a further temperature sensor is placed on the outer contour of the workpiece. Accordingly, from the ascertained temperature, the enthalpy to be dissipated can be calculated from stored tables in conjunction with the current machine cycle.

BRIEF DESCRIPTION OF THE DRAWINGS

The invention is described below in further detail in terms of an exemplary embodiment in conjunction with the drawing. Shown are.

DETAILED DESCRIPTION OF THE PREFERRED EMBODIMENT(S) OF THE INVENTION

Figure 1:
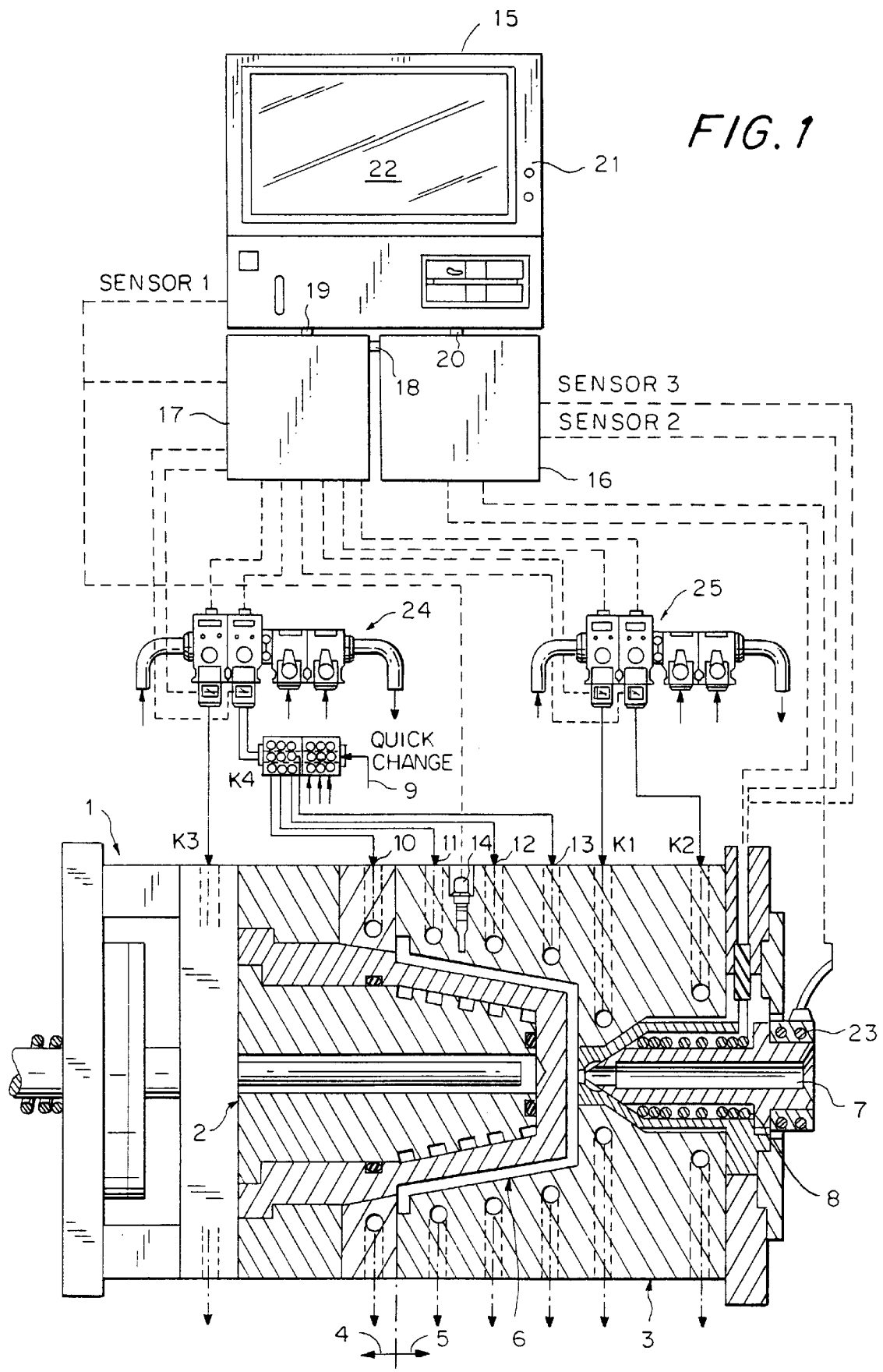
FIG. 1, a schematic illustration of an injection mold according to the invention with an associated tempering apparatus, and FIG. 2, a diagram of two successive injection cycles, shown in terms of the temperature course as a function of time and in conjunction with the supply of heat quantities to the individual runners for the plastic.

In FIG. 1 an injection molding tool 1 is shown, which includes two mold parts 2, 3, namely an outer mold part 3 and a core mold part 2, which can be removed from one another or opened in the direction of the arrows 4 and 5, respectively, in order to open the mold and remove the mold part from the mold cavity 6.

The casting mold shown in the exemplary embodiment is intended for plastic, and the plastic is supplied via a hot runner 7 for the plastic that is heated via heating coils 8.

Circulatory loops K1, K2, K3 and K4 are used to temper the mold parts 2, 3. The tempering medium can be distributed, as shown for the loop K4, via a distributor arrangement 9 of the kind for instance known from German Patent Application P 40 32 562, to individual conduit segments 10, 11, 12, 13. By means of a temperature sensor 14 mounted near the mold cavity (6), the temperature in the region of the mold cavity (6) is detected continuously.

An overall controller 15 includes a control module 16 in the form of an insertable card with a separate microprocessor, and a cooling control module 17 in the form of an insertable card which again has a separate microprocessor. The two modules 16, 17 are connected to one another via a data bus 18 and to a central input unit 21, which includes a touch screen 22, over further bus lines 19, 20.

The heating module 16 acts upon the heater (heating coils 8) of the hot runner for the plastic and also on preheating elements 23 for the melt, which are shown schematically in the drawing.

The cooling module 17 acts on valve assemblies 24, 25. The valve assembly 25 controls the loops K1 and K2, and the valve assembly 24 controls the loops K3 and K4. The valve assemblies make it possible to control the quantity of coolant and thus the quantity of heat to be dissipated by the cooling via the duration of opening of the valves and/or the opening cross section of the valves.

In FIG. 2, the temperature course in degrees Celsius is plotted as a function of the time t in seconds for two injection cycles. One injection cycle is formed by the injection of the liquid plastic into the empty injection mold, or into the cavity of the injection tool, the curing of the molded part, and its expulsion, until an empty mold cavity is again present and a new injection operation can occur. This clearly shows that after the hot, liquid plastic is injected via the hot runner for the plastic, the temperature, which is measured by the measuring sensor 14 in the vicinity of the mold cavity, initially rises up to a maximum value, and after the melt cools and is ejected, drops back to the starting temperature.

The energy balance is plotted below the time axis, which is associated with the temperature, or in other words below the upper time axis in FIG. 2, for the loops K1–K4 of the tempering medium.

In the loop K1, which extends in the transition region between the mold recess 6 and the hot runner 7 for the plastic, this energy balance includes on the one hand the melt heat of the melt supplied and on the other the percentage wise proportion of the heating output of the heating coils 8 of the hot runner 7 for the plastic. This quantity of heat must be dissipated per cycle or time period of the cycle via a corresponding volume of coolant.

In the loop K2, the percentage wise proportion of the heating output of the heating coils 8 must be taken into account with a corresponding cooling volume, while conversely in the loops K3 and K4, only the intrinsic amount of heat in the supplied melt needs to be dissipated.

According to the invention, the corresponding proportions of the heat quantity are fed from the heating module to the cooling module 17 via the data bus 18 after a first cycle I prior to the cycle that follows it, such as the cycle II, so that the cooling module can preadjustably meter its contribution of coolant quantity exactly in such a way that as accurately as possible the expected quantity of heat is dissipated again and correspondingly the mold wall regains its desired starting temperature in the quickest possible pacing time.

In the exemplary embodiment described above, the control modules for heating and cooling have been described as separate insertable cards. If processors with sufficient capacity are available, then it is understood to be within the scope of the invention to perform both the heat regulation and the cooling regulation inside a processor.

I claim:

1. A method for tempering an injection mold for die-casting a plastic or an aluminum part, said injection mold having at least one heated runner and means for cooling and heating, said method comprising the steps of introducing under pressure in a recurrent cycle, a molten material through said heated runner into a mold cavity of the injection mold, permitting the molten material to harden and thereafter removing the part formed from the injection mold, wherein a temperature is measured by at least one temperature measuring sensor during each said recurrent cycle and compared with a predetermined command temperature; and said means for cooling and heating are actuated to supply cooling or heating as a function of a deviation between the measured temperature and the predetermined command temperature; wherein respective measuring sensors control the means for the cooling and heating, wherein a three-dimensional quantitative distribution profile of the cooling or the heating is ascertained, and at least at one specific time during a recurrent cycle a comparison is made between the predetermined command temperature and the measured temperature of the one temperature measuring sensor, a plurality of flow control valves are triggered as a function of the deviation and as a function of the three-dimensional quantitative distribution profile of the cooling and the heating, wherein a separate controller, each with a separate processor, is respectively provided for the cooling and the heating, and that the amount of heat to be supplied to various regions of the mold in every said recurrent cycle, resulting from the heating and from a thermal quantity of the melt, is transmitted before a next said recurrent cycle to the controller of the means for cooling, and the cooling quantities are controlled as a function of an amount of said heating and the thermal quantity of the melt for the next recurrent cycle;

wherein the temperature, measured during each said recurrent cycle by the temperature measuring sensor located in the vicinity of the mold cavity, is compared with a lower temperature threshold, and as soon as the temperature drops below this lower temperature threshold the heating is reduced via the controller for the means for heating.

2. The method of claim 1, wherein the heating is reduced in regulated fashion in such a way that the temperature is adjusted to a second lower command value.

3. The method of claim 1, wherein an energy balance of each said recurrent cycle is provided for in order to control the quantities of the cooling.

4. The method of claim 1, wherein a differentiated detection of temperature gradients between the cavity mold and outer surfaces of the mold is performed as a function of whether the detection relates to a mold plate, an intermediate plate, or a removed plate of the injection mold.

5. The method of claim 1, wherein temperature differences in the means for cooling which are not disposed directly at the cavity and the corresponding plate regions of the molding tool are taken into account.

6. The method of claim 1, wherein when a heat transfer is detected, different heat transfer coefficients for water, in the means for cooling are taken into account.

7. The method of claim 1, wherein as a function of a temperature measured at a specific time during the recurrent cycles, heating elements of the hot runner are switched via a controller.

\* \* \* \* \*